(12) United States Patent
Kambli

(10) Patent No.: US 8,249,243 B2
(45) Date of Patent: Aug. 21, 2012

(54) METHOD OF REMOTELY OPERATING CONTACT CENTER SYSTEMS

(75) Inventor: Rajiv Kambli, Cupertino, CA (US)

(73) Assignee: Aspect Software, Inc., Lombard, IL (US)

( * ) Notice: Subject to any disclaimer, the term of this patent is extended or adjusted under 35 U.S.C. 154(b) by 799 days.

(21) Appl. No.: 12/270,238

(22) Filed: Nov. 13, 2008

(65) Prior Publication Data

US 2010/0119052 A1    May 13, 2010

(51) Int. Cl.
*H04M 3/00* (2006.01)
(52) U.S. Cl. .............................. 379/265.02; 379/265.03
(58) Field of Classification Search . 379/265.02–265.03
See application file for complete search history.

(56) References Cited

U.S. PATENT DOCUMENTS

| | | | |
|---|---|---|---|
| 6,594,470 B1* | 7/2003 | Barnes et al. | 455/67.7 |
| 6,654,458 B1* | 11/2003 | Saleh | 379/265.03 |
| 2009/0274293 A1* | 11/2009 | Barnett et al. | 379/266.01 |

* cited by examiner

*Primary Examiner* — Rasha Al Aubaidi
(74) *Attorney, Agent, or Firm* — Jon Christensen; Husch Blackwell LLP

(57) ABSTRACT

A method and apparatus are provided for controlling a server of a contact center system having a plurality of automatic contact centers. The method includes the steps of providing an audible menu to a supervisor of the contact center system having the plurality of automatic contact distributors, receiving an instruction from the supervisor and executing the received instruction within the server.

32 Claims, 2 Drawing Sheets

US 8,249,243 B2

METHOD OF REMOTELY OPERATING CONTACT CENTER SYSTEMS

FIELD OF THE INVENTION

The field of the invention relates to communication systems and, more particularly, to automatic contact distributors.

BACKGROUND OF THE INVENTION

Call centers are generally known. Call centers are typically used wherever an organization has occasion to handle a multitude of individual contacts with clients. Usually, the organization will hire a number of agents to interact with the organization's clients.

Contacts between the organization and clients may be handled under any of a number of different communication mediums. For example, contacts may be initiated through the public switch telephone network (PSTN) by a client calling a telephone number of the organization. Alternatively, the organization may place telephone calls to its clients. In either case, connection of the telephone call with an agent may be handled by an automatic call distributor (ACD).

Similarly, contacts with clients through the Internet may be handled by a host of a contact center. Contacts in this case may be handled under a voice format (e.g., VoIP) or under a text format (e.g., e-mail, chat, etc.).

Once a call is detected, the ACD may select an agent to handle the call. The agent may be selected based upon qualifications in handling the type of call involved, based upon experience with the client or based upon agent idle time. Once an agent is selected, the ACD may automatically route the call to a telephone or desktop of the selected agent.

In order to serve large markets, ACDs are often used as networked systems with locations in many different areas. In many cases, the ACDs of the networked system may have been manufactured by different providers and operate under different formats. Because of the importance of networked ACDs, a need exists for better methods of controlling ACDs in networked systems.

SUMMARY

A method and apparatus are provided for controlling a server of a contact center system having a plurality of automatic contact centers. The method includes the steps of providing an audible menu to a supervisor of the contact center system having the plurality of automatic contact distributors, receiving an instruction from the supervisor and executing the received instruction within the server.

DETAILED DESCRIPTION OF AN ILLUSTRATED EMBODIMENT

While call centers work well, they are constantly evolving and, in some cases, require replacement or expansion. When a call center made by a first call center provider must be replaced or expanded, the organization will often consider and may, in fact, purchase a call center from a competitor for use with existing, legacy call centers because of a lower price.

However, call center products from competitors often do not work well together because of differing operating philosophies, hardware and software. Because of the importance of call centers, a need exists for better method of coordinating the operation of call center products provided by competitors.

Figure 1:
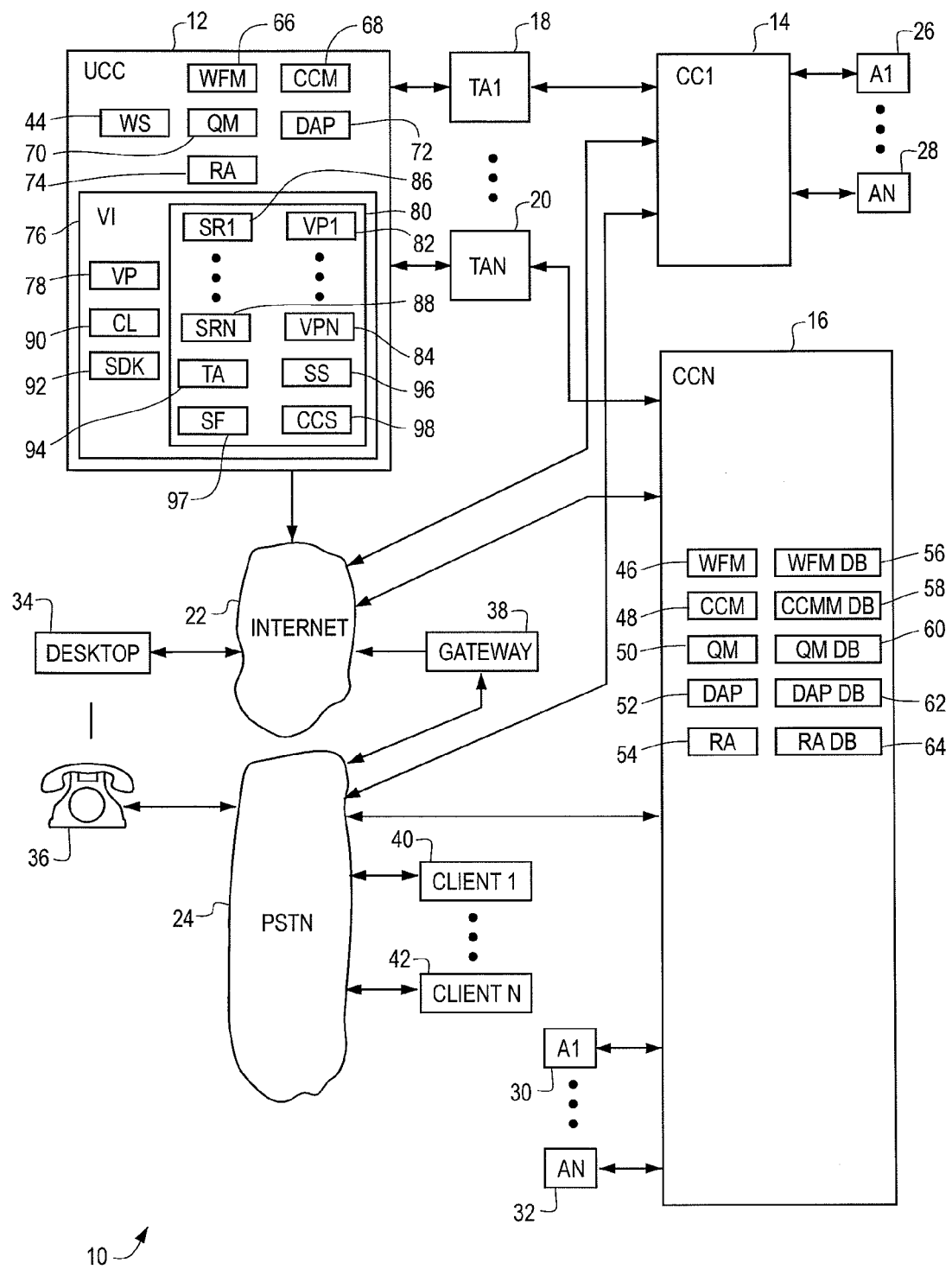
FIG. 1 is a block diagram of an automatic contact center system in accordance with an illustrated embodiment of the invention.

FIG. 1 is a block diagram of a call center system 10 shown generally in accordance with an illustrated embodiment of the invention. Included within the call center system is a unified command and control (UCC) server 12 for administering operation of a number of dissimilar call centers 14, 16 of the call center system. While FIG. 1 shows only two call centers 14, 16, it should be understood that the call center system 10 of FIG. 1 may include any number of call centers 14, 16. Moreover, the term "dissimilar call centers" should be understood to mean call centers that do not share the same command and control structure. For example, a First Point Spectrum ACD call center made during the late 1990s does not use the same command and control structure as an Aspect ACD made during the same time period.

Under the embodiment illustrated in FIG. 1, the UCC server 12 is coupled to the call centers 14, 16 through a respective terminal adapter 18, 20. One or more administrative persons (users) working through a terminal (the person and terminal together sometimes hereinafter referred to as an "admin user") 34 may access a website 44 of the server 12 through the Internet 22. The operation of the call centers 14, 16 may be controlled through the activities of an administrative user 34 through the server 12. While the admin user 34 and server 12 are shown connected through the Internet 22, the admin user 34 may be co-located and be directly connected to the server 12.

While the call centers 14, 16 may be different in structure and operation, the use of the terminal adapters 18, 20 allows the system of FIG. 1 to be operated as if it were one large call center. The server 12 may have a completely different control structure than any of the call centers 14, 16 and where there is very little in common among the call centers 14, 16. This allows the server 12 to operate under a "best of breed" philosophy where the terminal adapters 18, 20 accommodate any differences.

The architecture of the UCC server 12 is simple, scalable, and extensible. In simple conceptual terms, the applications of the UCC server 12 sit on top of existing administrative interface applications and databases of the call centers 14, 16. "Sitting on top of" means that the administrative interfaces and databases of the call centers 14, 16 do not rely upon the UCC server 12 for proper operation. The UCC server 12 uses the interfaces of the call systems 14, 16 to read data from their databases and to write changes into them, but it does not attempt to replace them. Instead, the applications of the UCC server 12 acts as a web wrapper, providing a unified view of administrative data, but not requiring any changes to the existing systems 14, 16. As much as possible, UCC server 12 simply acts as another client to the current administrative interfaces of the call centers 14, 16, which allows existing administrative tools to continue working independently, particularly in the case where the connection of the call centers 14, 16 with the UCC server 12 is lost.

In effect, the applications of the UCC server 12 control the call centers 14, 16 by changing the data within the databases of the call centers 14, 16. This has the advantage that the call centers 14, 16 function properly without any other input or control from the applications of the UCC server 12. If the UCC server 12 should malfunction or otherwise become inoperative, then data may be entered directly through an existing admin services desktop connected directly to the respective call centers 14, 16.

Since the server 12 merely changes data within the call centers 14, 16, there is no limit to the number of servers 12 within the system of FIG. 1. While one is shown in FIG. 1, the system 10 of FIG. 1 may contain two or more.

The ability to read data from the call centers 14, 16 allows resources to be shared among call centers 14, 16. For example, the entire list of agents 26, 28, 30, 32 may be visible through the server 12. However, some agents may be better skilled than others. In these cases, some agents may be shared among call center products and centers and some may not be shared.

In general, the call centers 14, 16 may rely upon a number of databases and database interfaces. For simplicity of explanation, the databases and respective interface will be grouped together in the following discussion.

In one embodiment, five administrative interface applications may be used. The five are: 1) a work force management (WFM) interface 56; 2) a call center management interface 58; 3) a quality management interface 60; 4) a directory access protocol (DAP) interface 62 and 5) a reporting database interface 64. The WFM interface 56 provides access to a WFM database within the call center 14, 16 and is used by a WFM application 46 within the respective call centers 14, 16. The WFM application operates on a first level to maintain a list of signed-in agents and also to predict a work force (e.g., the number of agents) needed during any one time period based upon historical records and current predictions. The WFM 46 may also monitor call queues of each agent group to determine how long calls remain in queue for the group and other statistics about agent performance. Other statistics may include calls per hour, abandoned calls, average call handling time, identifiers of agent groups and an identifier of each agent assigned to each of the identified agent groups.

The call center management interface 58 provides access to a call management database within each respective call center 14, 16. The call management database is used by a call management application 48 to maintain a list of agents and the qualification of each agent. The call management application 48 may also be used to select agents to handle calls based upon any appropriate method (e.g., agent idle time, agent skill, etc.). The call management application may also track agent availability.

The quality management interface 60 provides access to a quality management database within each of the respective call centers 14, 16. The quality management database is used by a quality management application 50 to record calls and other data about call handling by agents.

The directory access protocol interface 62 provides access to a directory access protocol database. The directory access protocol database 62 may be accessed by a lightweight directory access protocol (LDAP) 52 to provide access control to the call centers 14, 16. The directory access protocol database contains a list of users, passwords and access rights of each user.

The reporting interface 64 provides access to a report database (e.g., viewpoint, datamart, etc). The report databases may collect data regarding any of a number of call center operations (e.g., agent performance, call statistics, etc.). Reporting data may be collected from other interfaces 56, 58, 60, 62 or may be generated independently.

Located within the server 12 may be a respective workforce management application (WFMA) 66, a call center management application (CCMA) 68, a quality management application (QMA) 70, a data access protocol application (DAPA) 72 and a reporting application 74. Each of the applications 66, 68, 70, 72 is accessible by the admin user 34 through the website 44. The applications 66, 68, 70, 72 serve at least some of the same function as the respective applications 46, 48, 50, 52, 54 of the call centers 14, 16 except that at least some of the respective applications of the call centers 14, 16 operate under a different protocol than the respective applications 66, 68, 70, 72 of the UCC server 12.

The applications 66, 68, 70, 72 of the server 12 differ from the corresponding applications 46, 48, 50, 52, 54 of the call centers 14, 16 in that they operate over a larger database and, therefore, can achieve economies of scale and efficiency that are not possible by the call centers 14, 16 working in isolation. For example, the applications 66, 68, 70, 72 have the ability to handle all calls and all agents as if they were part of a single integrated call center located in a single location. The server 12 is able to accomplish this because it is able to match any call with any agent using methods that are described in more detail below.

In general, access to the call centers 14, 16 by the applications 66, 68, 70, 72 of the server 12 is provided through a respective terminal adapter 18, 20. In each case, instructions from the applications 66, 68, 70, 72 are executed on the call centers 14, 16 by mapping the instructions from the protocol of the server 12 to the respective protocols of the call centers 14, 16 within a mapping processor within each of the respective terminal adapters 18, 20. Once an instruction from an application 66, 68, 70, 72 has been mapped to the appropriate protocol, the instruction may be executed by the respective database interfaces 56, 58, 60, 62, 64.

Instructions from the server 12 to the call centers 14, 16 may involve and cause a change to the respective databases of the call center 14, 16 or may be a request for data from the database. Where the request is for data, the database interface 56, 58, 60, 62, 64 may retrieve the requested data and compose a message to send the requested data back to the requestor.

As the data message is returned, the message may arrive at the terminal adapter 18, 20 providing the original instruction. In response, the terminal adapter 18, 20 may reformat the data message into a format of the server 12.

Included within the server 12 may be one or more databases that correspond to the applications 66, 68, 70, 72. Under one illustrated embodiment, all or a portion of the data within the respective databases associated with the call centers 14, 16 may be substantially duplicated within respective databases of the UCC server 12. In this regard, data from WFM databases of the call centers 14, 16 may be merged to form a consolidated database of WFM information within the UCC server 12. Similarly, data from the CCM databases may be merged in a CCM database of the server 12, data from QMI databases may be merged in a QMI database of the server 12, data from DAP databases may be merged in a DAP database of the server 12 and data from the reporting databases may be merged in a reporting database of the server 12. This may be accomplished by the call center applications 46, 48, 50, 52, 54 tracking and forwarding the changes or by the applications 66, 68, 70, 72 periodically requesting such data.

By having a duplicate of the data within the call centers 14, 16, the UCC server 12 is able to control the overall allocation of resources within the call center system 10. For example, agents 26, 28 may be physically connected to call center 14 and agents 30, 32 may be physically connected to call center 16. However, agents 26, 28, 30, 32 may be shared by all call centers 14, 16. The sharing of agents among call centers 14, 16 is important because loading is not always equal among call centers. In addition, not all agents have equal skills.

Agents 26, 28, 30, 32 with greater skills are often put to greater use when shared among a larger client base.

However, the design supports an embodiment where the database is not replicated in the admin server and instead, it relies upon the call center product databases to be the only persistent storage of their data.

Under one illustrated embodiment, the call center management application 68 may control agent assignment among the call centers 14, 16. In this case, the call management database 68 may receive or retrieve a list of available agents 26, 28, 30, 32 from each call center 14, 16 along with a list of agent qualifications. To control agent assignment, the call management application 68 may initially download an agent occupied flag to the call management database of each call center 14, 16 listing each agent 26, 28, 30, 32 as occupied by other calls.

As each call is received at a call center (e.g., call center 14), the call management application 68 may detect the arrival of the call via the creation of a call arrival file in the call management database 58 of the call center 14 and the forwarding of that file to the corresponding database of the UCC server 12. In response, the call management application 68 may compare the requirements of each call with a list of agent skills in the database and may select an agent (e.g., agent 26) to handle the call. Once the call management application 68 has selected the agent 26, the call management application 68 may download an instruction to clear the agent occupied flag for the agent 26. The instruction is transferred from the UCC server 12 to the terminal adapter 18 where the instruction is mapped to the protocol used by the call center 14. The mapped instruction is then transferred to the call center management interface application 58 that, in turn, clears the agent occupied flag for the selected agent 26 within the database.

Since the other agents associated of the call center 14 were previously shown as occupied, the call management application 48 of call center 14 had been in a wait state for an available agent 26, 28 following arrival of the call. However, once the call management application 68 downloads the instruction to clear the agent occupied flag for agent 26, the call management application of the call center 14 would detect the availability of agent 26, select agent 26 and transfer the call to agent 26.

Once the call management application within the call center 14 has selected agent 26 to handle the call, the call management application of the call center 14 would again set the agent occupied flag for agent 26 within the database. The call management application 68 within the UCC server 12 would detect the setting of this flag as confirmation of assignment of the call to the agent 26.

Once the agent 26 had completed the call, the agent 26 would activate a call release softkey on his desktop. In response, the call management application 48 within the call center 14 would detect activation of the softkey and clear the agent occupied flag for the agent 26.

The call management application 68 would detect clearing of the agent occupied flag for the agent 26 as indication that the agent 26 was again available. In response, the call management application 68 would again immediately send another instruction setting the agent occupied flag for agent 26 to the call center 14.

As another example, another call may be received by the call center 14. Since all the agents 26, 28 are shown as previously occupied, the call management application within the call center 14 enters a wait state.

For this new call, the call management application 68 may detect the call and select agent 30 to handle the call. In this case, it may be assumed that the call management applications 48 of the call centers 14, 16 contain a list of all agents 26, 28, 30, 32 and the ability to transfer calls among call centers 14, 16.

As a first step, the call management application 68 transfers an instruction to the call center 14 instructing the call center 14 to transfer the call to the other call center 16. Alternatively, the call center 14 may have the ability to detect idle agents at the other call center 16 and transfer calls upon detection of an idle agent. In this situation, the call management application 68 transfers an instruction to the call center 16 clearing the agent occupied flag for the selected agent 30. The call management application of the first call center 14 detects the availability of agent 30 and transfers the call to the second call center 16. The second call center assigns the call to the agent 30 in a manner similar to the previous example.

In the normal course of operation, it may be assumed that the admin user 34 may access any of the call center applications 66, 68, 70, 72, 74 within the UCC server 12. For example, by accessing the workforce management application 66, the user 34 can view the overall workforce status of the system 10 of FIG. 1.

For example, on a first screen, the user 34 may view a list of agents 26, 28, 30, 32 logged into the system of FIG. 1. On another screen, the user can view the performance of each call center 14, 16. More specifically, the availability of data from the WFM database allows the admin user 34 to view such performance statistics such as average delay to answer, the average call handling time, schedule adherence metrics, etc. By viewing performance statistics, such as call queues, the admin user 34 has the ability to determine whether the call centers 14, 16 are performing at an optimum level, are overloaded or are under utilized.

Moreover, where the admin user 34 should detect that a call center 14, 16 is overloaded, the admin user 34 may simply log onto the WFM application 66 and transfer agents. For example, if a first set of agents 26, 28 were assigned to a first agent group (group "A") and a second set of agents 30, 32 were assigned to a second agent group (group "B") and group A were overloaded, then the admin user 34 could reassign agents as needed. In this example, the admin user 34 would log into the WFM application 66 and select group B and delete agent 30. The admin user 22 may then select group A and add agent 30. In both cases, the deletion and addition steps would cause an instruction to be generated by the call center management application 68 that would be transferred to and executed by the call centers 14, 16.

Alternatively, the admin user 34 may activate a quality management application 70. In this case, the admin user 34 may be presented with a screen where the user 34 can select agents 26, 28, 30, 32 to record for quality assurance purposes or where the user 34 can review previously made recordings of agents 26, 28, 30, 32. In the case where the user 34 wishes to designate an agent 26, 28, 30, 32 for recording, the user may enter an identifier of the agent 26, 28, 30, 32. Upon activating an ENTER softkey on the terminal 34, the quality management application 70 downloads an instruction to the quality management interface 60 for entry of the identifier of the agent 26, 28, 30, 32 into a recording list within the quality management database.

Alternatively, the instruction entered by the admin user 34 may have been a playback instruction. In this case, the quality management application 70 may simply retrieve the recording from the quality management database and play the recording for the benefit of the user 34.

The admin user 34 may also access a data access protocol application 72. In this case, the admin user 34 may be presented with a screen where the user 34 may add or delete users or change access rights and privileges. For example, the user 34 may enter an identifier of an agent 26 and activate an ENTER softkey. In response, the data access protocol application 72 may present the admin user 34 with a screen of current access rights of the agent 26. The user 34 may amend the access rights or even delete the agent 26. In response, the data access protocol application 72 may generate an instruction that is forwarded to the data access protocol interface 62 saving the changes made by the admin user 34.

Under illustrated embodiments, the UCC server 12 may also include a voice interface 76 coupled to the call center applications 66, 68, 70, 72 within the UCC server 12. Using the voice interface 76, the administrative user (now referred to as administrative user 36) may access the UCC server 12 using a voice connection and retrieve contact center information or make configuration changes as appropriate to the status of the system 10.

Voice access by the administrative user 36 to the UCC server 12 may be accomplished under any of a number of different formats. For example, the administrative user 36 may enter a telephone number assigned to the voice interface 76 and be connected to the voice interface through a switched-circuit-to-VoIP gateway 38. Alternatively, the administrative user 36 may dial a telephone number assigned to the voice interface 76 and be connected to the voice interface 76 through one of the contact centers 14, 16 and respective terminal adapter 18, 20. Under this scenario, a voice processor 78 may be located within the respective contact center 14, 16 to reduce the bandwidth required by the connection with the voice interface 76.

In either case, once the user 36 is connected with the voice interface 76, the voice processor 78 operating under the control of one or more selection routines 86, 88 residing in memory 80 and a voice synthesizer may present the user 36 with an initial audible menu. Menu items may include the prompt "would you like to be connected to work force management, call control management, quality management, directory access or reports administration." Alternatively, the voice interface 76 may simply wait silently for the administrator to verbally identify one of the call processing applications 66, 68, 70, 72, 74.

In either case, the voice processor 78 receives any sound uttered (or touch tones provided) by the user 36 and a speech recognition processor or comparator compares the detected sound with a set of verbal profiles 82, 84 in memory 80. In this case, each of the verbal (or touch tone) profiles 82, 84 would contain a verbal (or touch tone) template that corresponds to at least one choice in the presented menu. At least some of the verbal profiles 82, 84 may include alternate word choices for menu selections.

Figure 2:
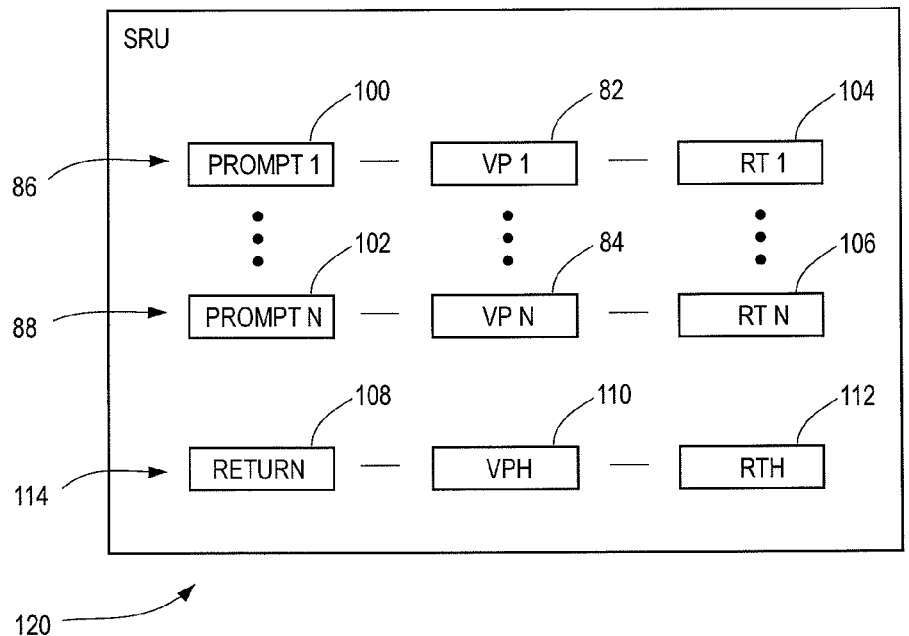
FIG. 2 depicts a set of verbal menus that may be used by the system of FIG. 1.

FIG. 2 is a block diagram of a verbal menu 120 including a number of selection routines 86, 88, 114 that may be created for use by the administrative supervisor. As shown, each menu entry may have a verbal prompt 100, 102, 108 and a corresponding verbal profile 82, 84, 110 that is used to recognize selection of the respective menu entry. Also associated with each menu item is a routine or set of instructions 104, 106, 112 for executing the selection.

It should be noted in this regard that, at a root level, a selection routine 86, 88 may be provided within the root menu for each of the call processing applications 66, 68, 70, 72, 74. In the case of the initial menu, the first verbal prompt 100 may be the words "do you want workforce management." The corresponding verbal profile 82 may be an audio profile or concatenation of phonemes the are used to recognize by (matching or otherwise) the words "workforce management" or the word "yes" within some time limit (e.g., 2 seconds)

after the verbal prompt. The routine or set of instructions 104 may be a set of computer instructions that activate the WFM application 66 and that interact with a WFM client 90 downloaded to the voice interface 76 from the WFM application. In effect, the selection routines 86, 88 function as interfaces that exchange information between the respective clients 90 of the call processing applications 66, 68, 70, 72, 74 and the user 34.

Figure 3:
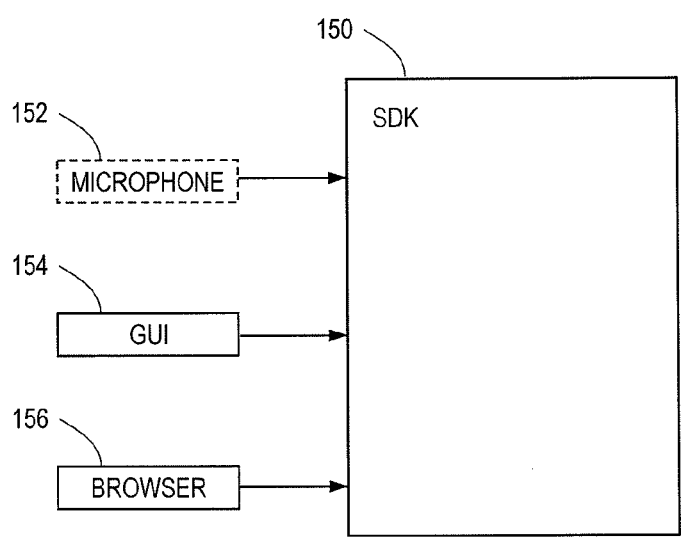
FIG. 3 is a block diagram of a set of processing elements that may be used by the software development kit of FIG. 1.

The selection routines 88, 90 may be easily configured using a software development kit (SDK) 92. FIG. 3 is a block diagram of a set of processing elements that may be used by the SDK 92 to provide selection routines 86, 88. The box labeled 150 may be the SDK 92 shown in FIG. 1 or a client downloaded from the voice interface 76 to the desktop 34 of the user.

In order to create selection routines, the user may first download a client 90 from a call processing application 66, 68, 70, 72, 74 and the SDK client 150. The SDK client 150 monitors both a graphical user interface (GUI) 154 of the browser 156 and also an output of the browser 154. The client 90 may display a window or webpage with one or more hyperlinks with text identifiers or icons. By monitoring the GUI 154, the SDK client 150 is able to detect selection of a hyperlink and the text label associated with the hyperlink. By monitoring the output of the browser 154, the SDK client 150 is able to capture one or more instruction issued by the browser 156 in response to activation of that hyperlink. Each time the user 34 activates a hyperlink, the SDK client 150 adds the captured instructions to an instruction field 104, 106 of a respective selection routine 86, 88. The captured text associated with the hyperlink may be added to a prompt field 100, 102 and a verbal profile field 82, 84. Alternatively, the user 34 may also use an optional microphone 152 to add a customized prompt 100, 103 and/or customized voice profile 82, 84 for use with any particular selection routine 86, 88.

Using the process described above, the user 34 can use the browser 156 within the desktop 34 to create a set of selection routines 86, 88 that go to any depth. For example, if the user 34 should start at the root and select the WFM application 66, then the WFM application 66 would be added as a first voice selection entry 86 in a particular menu level. If the user 34 should activate the BACK arrow on his/her browser 154 and then activate the call control application 68, then the call control application 68 would be added as a second entry 88 within this menu level.

Alternatively, the user 34 may drag a cursor over a number of hyperlinks to highlight the number of hyperlinks. In this case, the SDK 92 may add each of the number of hyperlinks as separate entries within a menu at this level with the text associated with the hyperlink added as a prompt 100, 102 and as a profile 82, 84 and the path associated with each of the hyperlinks to a respective instruction sets 104, 106.

On the other hand, if the user 34 had stayed on the WFM webpage and activated a signed-in agents hyperlink, then the agent 34 would be presented with a list of signed-in agents and the SDK 88 would add a second layer to the menu item to the entry 86 of FIG. 2. If the user 34, again, activates a back key and selects a call queues hyperlink then the user 34 would be presented with a set of system call queue statistics and the SDK 88 would add another menu item to the second layer of the menu.

In response, the user 34 is provided with a set of system call queue statistics including a wait time for each queue. If the user 34 should decide that one particular queue has too long a wait, the user 34 may activate a transfer agent application and the SDK 88 would add a third menu layer. The user 34 may select a first agent group and agent and a second agent group and activate a transfer softkey to add fourth and fifth layers to the menu structure.

Moreover, the user 34 may automate certain features into a set of sequence steps. For example, in the root directory, the user may add the prompt 100, 102 and verbal profile 82, 84 of "transfer agents." The user may then activate the WFM prompt. In response, the instructions for accessing the WFM application 66 would be added to the instruction set 104, 106. Without adding another prompt 100, 102 or voice profile 82, 84, the user 34 may activate a transfer agents application. Activation of the transfer agents application would cause the associated instructions for activating this application to be concatenated to the existing instruction set 104, 106 as part of a single sequence of steps. The user 34 may then create other menu levels by adding one or more menus of contact centers 14, 16 and agent groups from which the transferred agent is obtained and another one or more menu levels of contact centers 14, 16 and agent groups to which the agent is to be transferred. In this example, the SDK 88 may save the automated transfer agents sequence steps into a transfer agents file 94.

Other automated data retrieval and configuration change files may also be formulated in the same way. For example, a system statistics file 97 may be created using substantially the same method. Similarly, a contact center statistics file 98 may be created that first offers a verbal menu of the individual contact centers and then a second level menu of types of statistics.

In use, the administrative user 36 places a call to the voice interface 76. The voice interface 76 answers the call and presents the supervisor 36 with a menu of options at a root level. The user 36 may select one or more options to monitor statistics or make configuration changes. For example, if the user 36 decides to make a configuration change, then the user 36 selects the proper option followed by a source group and agent and a destination group and activates an enter softkey. In response, the voice interface 76 composes a set of configuration instructions to the WFM application 66 that composes the configuration changes and saves them in a local agent group database. The WFM application 66 also generates one or more configuration messages that are transferred to the contact centers 14, 16 through the terminal adapters 18, 20. Within the terminal adapters 18, 20, the configuration messages are converted into a native language of the contact centers 14, 16 where the configuration changes are made based upon the converted configuration messages.

A specific embodiment of method and apparatus for controlling a group of dissimilar call centers has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of controlling a central control server of a contact center system having a plurality of dissimilar automatic contact centers, the contact control server including a plurality of server applications to control the plurality of automatic contact centers, such method comprising:

providing an audible menu to a supervisor of the contact center system having the plurality of automatic contact distributors, via a voice connection with the central server;

receiving an instruction from the supervisor making a menu selection;

composing a set of instructions to a selected one of the plurality of server applications in response to the menu selection executing the set of instruction within the server such that the selected server application generates contact messages for transfer to the plurality of contact centers; and converting the control messages to a native language of each contact center to which the control messages are transferred.

2. The method of controlling the server of claim 1 further comprising executing the received instruction within at least one of the plurality of contact centers.

3. The method of controlling the server of claim 2 further comprising providing a root menu having a selection routine for each of the server applications.

4. The method of controlling the server of claim 1 wherein the menu and received instruction further comprise audible information exchanged through a telephone connection.

5. The method of controlling the server of claim 1 wherein the received instruction further comprise touch-tone information received through a telephone connection.

6. The method of controlling the server of claim 1 wherein the menus further comprises system statistics.

7. The method of controlling the server of claim 1 wherein the menu further comprises each of the plurality of contact centers.

8. The method of controlling the server of claim 1 wherein the menu further comprises configuration changes to at least some of the plurality of contact centers.

9. The method of controlling the server of claim 8 wherein the configuration changes further comprises transferring agents among agent groups.

10. The method of controlling the server of claim 8 wherein the configuration changes further comprises adding or deleting agents.

11. The method of controlling the server of claim 8 wherein the menu further comprises a root level including at least some of the group consisting of workforce management, call center management, quality management, directory access protocol, reporting.

12. An apparatus for controlling a control server of a contact center system having a plurality of automatic contact centers, the control server including a plurality of server applications to control the plurality of automatic contact centers, such method comprising:

means for providing an audible menu to a supervisor of the contact center system having the plurality of automatic contact distributors;

means for receiving an instruction from the supervisor making a menu selection;

means for composing a set of instructions to a selected one of the plurality of server applications in response to the menu selection means for executing the received instruction within the server such that the selected server application generates contact messages for transfer to the plurality of contact centers; and means for converting the control messages to a native language of each contact center to which the control messages are transferred.

13. The apparatus for controlling the server of claim 12 further comprising means for executing the received instruction within at least one of the plurality of contact centers.

14. The apparatus for controlling the server of claim 13 further comprising means for providing a root menu having a routine for each of the server applications.

15. The apparatus for controlling the server of claim 12 wherein the menu and received instruction further comprise audible information exchanged through a telephone connection.

16. The apparatus for controlling the server of claim 12 wherein the received instruction further comprise touch-tone information received through a telephone connection.

17. The apparatus for controlling the server of claim 12 wherein the menus further comprises system statistics.

18. The apparatus for controlling the server of claim 12 wherein the menu further comprises at least some of the plurality of contact centers.

19. The apparatus for controlling the server of claim 12 wherein the menu further comprises configuration changes to at least some of the plurality of contact centers.

20. The apparatus for controlling the server of claim 19 wherein the configuration changes further comprises means for transferring agents among agent groups.

21. The apparatus for controlling the server of claim 19 wherein the configuration changes further comprises means for adding or deleting agents.

22. The apparatus for controlling the server of claim 19 wherein the menu further comprises a root level including at least some of the group consisting of workforce management, call center management, quality management, directory access protocol, reporting.

23. An apparatus for controlling a contact center system having a plurality of dissimilar automatic contact centers, such method comprising:
   a control server having a voice interface;
   an audible menu provided to a supervisor of the contact center system having the plurality of automatic contact distributors;
   an instruction received by the server from the supervisor making a selection from the menu;
   the server composing a set of instructions to a selected one of the plurality of server applications in response to the menu selection
   the server that executes the set of instructions such that the selected server application generates contact messages for transfer to the plurality of contact centers; and
   a terminal adapter converting the control messages to a native language of each contact center to which the control messages are transferred.

24. The apparatus for controlling the server of claim 23 further comprising at least one of the plurality of contact centers that executes at least a portion of the received instruction.

25. The apparatus for controlling the server of claim 24 further comprising a root menu having a selected routine for each of the server applications.

26. The apparatus for controlling the server of claim 23 wherein the menu and received instruction further comprise audible information exchanged through a telephone connection.

27. The apparatus for controlling the server of claim 23 wherein the received instruction further comprise touch-tone information received through a telephone connection.

28. The apparatus for controlling the server of claim 23 wherein the menus further comprises system statistics.

29. The apparatus for controlling the server of claim 23 wherein the menu further comprises at least some of the plurality of contact centers.

30. The apparatus for controlling the server of claim 23 wherein the menu further comprises configuration changes to at least some of the plurality of contact centers.

31. The apparatus for controlling the server of claim 30 wherein the configuration changes further comprises an agent transferred among agent groups.

32. The apparatus for controlling the server of claim 30 wherein the configuration changes further comprises an added or deleted agent.

* * * * *